March 27, 1951
R. A. ASHTON
2,546,684
AUTOMATIC LOADING MECHANISM FOR
CONTINUOUSLY ROTATED CHUCKS
Filed Nov. 8, 1947
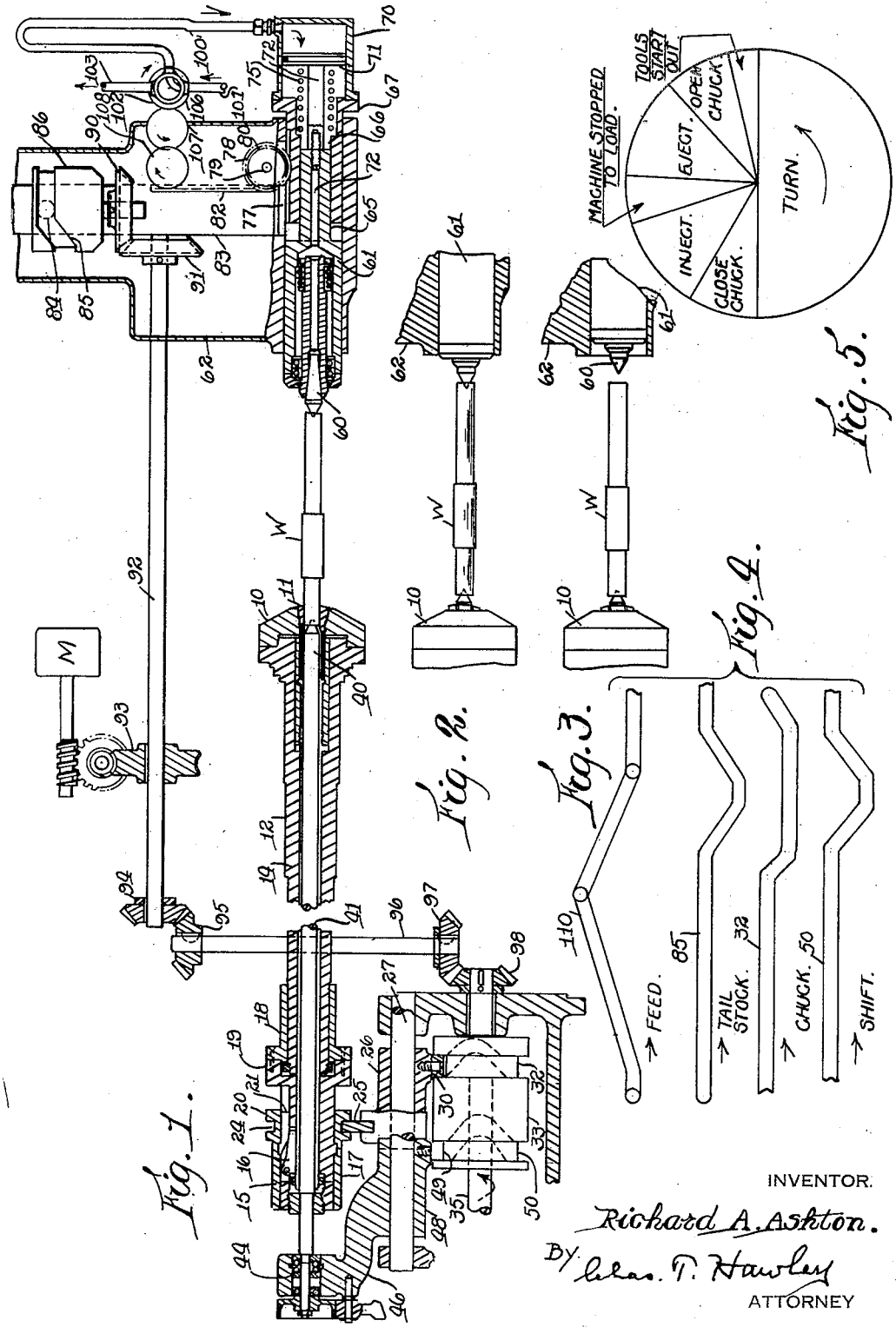
INVENTOR.
Richard A. Ashton.
BY Chas. T. Hawley
ATTORNEY Patented Mar. 27, 1951

2,546,684

UNITED STATES PATENT OFFICE 2,546,684

AUTOMATIC LOADING MECHANISM FOR CONTINUOUSLY ROTATED CHUCKS

Richard A. Ashton, Seneca Falls, N. Y., assignor to Seneca Falls Machine Company, Seneca Falls, N. Y., a corporation of Massachusetts Application November 8, 1947, Serial No. 784,815

4 Claims. (Cl. 82—2.7)

This invention relates to lathes, grinding machines and other machine tools in which a work piece is gripped and rotated by a collet-type chuck. In such machines, it may be desirable to rotate the work spindle and associated parts continuously, instead of stopping and starting the work spindle each time a finished work piece is to be removed and a new work piece is to be inserted.

It is the general object of this invention to provide an improved loading mechanism by which a finished workpiece may be released and discharged and a new work piece may be inserted and gripped while the work spindle is in continuous rotation.

More specifically, I provide mechanism by which the finished work piece is axially pushed out of the collet jaws of the driving chuck for discharge and replacement, and by which a new work piece is axially returned to gripping position in the chuck. I also provide means by which a suitable tail center will receive similar axial movements and will coact in the unloading and reloading operations.

My invention further relates to arrangements and combinations of parts which will be hereinafter described and more particularly pointed out in the appended claims.

A preferred form of the invention is shown in the drawings, in which

Fig. 1 is a sectional side elevation of parts of a machine tool embodying my invention;

Figs. 2 and 3 are detail views of certain parts appearing in Fig. 1 but showing different operative relations;

Fig. 4 is a projection of the operative paths of certain associated cams; and

Fig. 5 is a diagram showing a typical lay-out or subdivision of the machine cycle.

Referring to Fig. 1, I have shown a chuck 10 having collet jaws 11 adapted to grip one end of a piece of work W. The chuck 10 is mounted on a work spindle 12 supported in the usual head-stock (not shown), and the collet jaws 11 are connected to a tube 14 axially slidable in the spindle 12 and having a collar 15 threaded on its rear end portion.

The collar 15 is engaged by a plurality of cam levers 16 mounted in an extension 17 of the work spindle 12. The extension 17 is clamped to a spindle sleeve 18, secured on the spindle 12 by a nut 19. A sleeve 20 is slidable on the extension 17 and has inner cam portions 21 adapted to engage and depress the long arms of the cam levers 16, thus forcing the collar 15 and tube 14 to the left and closing the collet jaws 11 on the work W.

The sleeve 20 has a peripheral groove 24 which receives a stud 25 mounted in a transmitting member 26 which is slidable on a fixed shaft 27. A cam roll 30 on the member 26 is positioned in a cam groove 32 in a cam 33 secured to and rotatable with a shaft 35.

A live center 40 is formed at one end of a rod 41 slidable axially in the work spindle 12. The rear end of said rod is supported in anti-friction thrust bearings 44 secured in the rear end of an arm 46, which in turn is supported by and slidable on the fixed shaft 27 previously described.

A hub portion 48 of the arm 46 has a cam roll 49 positioned in a cam groove 50 formed in or associated with the cam 33 previously described. As the cam 33 rotates, the rod 41 and the live center 40 receive timed axial movements toward and away from the work W.

A tail center 60 is mounted in anti-friction bearings in a member 61 which is slidable axially in the tail stock 62. An extension 65 of the member 61 is slidable in a recess 66 in a member 67 which is also mounted to slide in the tail stock 62.

An air cylinder 70 is mounted at the rear of the member 67, and a piston 71 in said cylinder is connected by a rod 72 to the reduced extension 65 of the member 61 which carries the tail center 60. A spring 75 is interposed between the piston 71 and the member 67.

The member 67 is provided with rack teeth 77 engaged by a pinion 78 on a cross shaft 79 mounted in the tail stock 62. A second pinion 80 on the shaft 79 engages rack teeth 82 on a slide 83 mounted in guideways in the tail stock 62 and having a cam roll 84 seated in a cam groove 85 in a rotating cam 86.

Bevel gears 90 and 91 connect the cam 86 to a drive shaft 92 which is continuously rotated from a motor M through a double worm and worm gear drive, indicated generally at 93. Bevel gears 94 and 95 connect the drive shaft 92 to a cross shaft 96, which in turn is connected through bevel gears 97 and 98 to the cam shaft 35 which controls the movements of the collet jaws 11 and live center 40.

The air cylinder 70 receives air through a flexible pipe 100 from a feed pipe 101 through a three-way valve 102 having an exhaust pipe 103. The valve 102 is connected through gears 106, 107 and 108 to the rack teeth 82 on the slide 83 previously described.

The cycle of operations of the various parts is as follows: The parts are shown in running position in Fig. 1, with the work W engaged by the live center 40 and gripped by the collet jaws 11, and with the tail center 60 yieldingly held against the tail end of the work by air pressure in the cylinder 70.

The parts are held in this position during the operation of the tools on the work, the tool feed being controlled by a feed cam groove 110 (Fig. 4). The cam grooves 32, 50, 85 and 110 are so related that as soon as the work is completed, the collet jaws 11 will be released, the head center 40 will be advanced to push the work out of the collet jaws, and the supporting members 61 and 65 and the cylinder 70 will be moved rearward, so that the parts will then assume the positions shown in Fig. 2.

As this movement is completed, a quarter revolution of the three-way valve 102 will likewise be completed, thus connecting the pipe 100 to the discharge pipe 103 and relieving the pressure in the cylinder 70 so that the spring 75 may withdraw the tail center 60 to the position shown in Fig. 3.

The work W may then be removed and replaced, either manually or automatically, whereupon continued rotation of the cams will again cause air pressure to be applied in the cylinder 70 to advance the tail center 60 to support the adjacent end of the work piece W. The tail center assembly will then be advanced by the gear 80 and rack 77 to the position shown in Fig. 1, thus inserting the new work piece in the collet jaws 11, while at the same time the engaged live center 40 will be shifted to the left. The collet jaws 11 are then closed on the new work piece and the tools are fed for performance of the required machine operations on the work piece.

A typical division of the machine cycle is shown diagrammatically in Fig. 4 but it is to be understood that this cycle may be widely varied by using different cam lay-outs to meet different operating conditions.

Having thus described my invention and the advantages thereof, I do not wish to be limited to the details herein disclosed, otherwise than as set forth in the claims, but what I claim is:

1. A lathe comprising a head stock, a tail stock, a hollow work-gripping chuck rotatably mounted in said head stock, work supporting means slidable in said hollow chuck for centering and gripping one end of the work, work supporting means slidable in said tail stock for centering and gripping the other end of the work, positive means for sliding said tail stock means, impositive means for sliding said tail stock means relative to said positive means, positive means for sliding said head stock means, and control means operatively connected to said positive and impositive means to operate said impositive means to cause said tail stock means to engage one end of the work and force its other end into engagement with said head stock means, to then operate said positive means to move said head stock and tail stock means and the work to position said head stock means and its end of the work in gripping position with respect to said chuck and after a work period to reverse said control operation to cause said positive means to move the head stock means and work out of said chuck while gripped by said tail stock means, and thereafter to cause said impositive means to move said tail stock means from the work to release the same.

2. A lathe as in claim 1, wherein the chuck is continuously rotatable.

3. A lathe as in claim 2, wherein means associated with the chuck effects timed gripping and releasing activities of the chuck relative to the work.

4. A lathe as in claim 3, wherein the impositive means is both fluid and spring controlled in its operation.

RICHARD A. ASHTON.

REFERENCES CITED

The following references are of record in the file of this patent:

UNITED STATES PATENTS

| Number | Name | Date |
|---|---|---|
| 1,914,984 | Smith et al. | June 20, 1933 |
| 1,936,401 | Lovely | Nov. 21, 1933 |
| 2,062,415 | Harrison | Dec. 1, 1936 |
| 2,248,168 | Gleason | July 8, 1941 |
| 2,356,226 | Delahan | Aug. 22, 1944 |
| 2,374,769 | Musante | May 1, 1945 |

FOREIGN PATENTS

| Number | Country | Date |
|---|---|---|
| 450,881 | Germany | Oct. 15, 1927 |